(12) United States Patent
Muraro

(10) Patent No.: US 6,431,303 B1
(45) Date of Patent: Aug. 13, 2002

(54) CAB FOR EARTH-MOVING MACHINES

(75) Inventor: Umberto Muraro, Noventa Vicentina (IT)

(73) Assignee: Komatsu Utility Europe Sp.A., Vicenza (IT)

( * ) Notice: Subject to any disclaimer, the term of this patent is extended or adjusted under 35 U.S.C. 154(b) by 0 days.

(21) Appl. No.: 09/691,573

(22) Filed: Oct. 18, 2000

(51) Int. Cl.⁷ .............................................. B60K 28/00
(52) U.S. Cl. ...................... 180/272; 180/273; 180/268
(58) Field of Search .............................. 180/272, 273, 180/315, 326, 268

(56) References Cited

U.S. PATENT DOCUMENTS

| | | | | |
|---|---|---|---|---|
| 4,802,549 A | * | 2/1989 | Martinez ................. | 180/89.13 |
| 5,033,000 A | * | 7/1991 | Littejohn et al. ...... | 364/424.05 |
| 5,050,700 A | | 9/1991 | Kim | |
| 5,520,258 A | * | 5/1996 | Kemshall .................... | 180/68.5 |
| 5,713,189 A | * | 2/1998 | Toman ............................. | 56/7 |
| 5,971,434 A | | 10/1999 | Neufeld et al. | |
| 6,089,353 A | * | 7/2000 | Bartels et al. .............. | 187/224 |

* cited by examiner

Primary Examiner—Kenneth R. Rice
Assistant Examiner—Christopher Buchanan
(74) Attorney, Agent, or Firm—Browdy and Neimark

(57) ABSTRACT

A cab for earth-moving machines comprising a structure, a control station for the operator defined within the structure, a safety bar pivotally fastened internally to the structure and movable from a safety position in which said bar is positioned in front of the control station and in which the operator is secured in the control station, to a non operative position, distanced from the safety position, in which the operator is free to move from the control station, and at least a control panel of the machine mounted in the structure and oriented towards the control station, integrally mounted on a portion of the bar oriented towards the control station when the bar is in the safety position.

3 Claims, 3 Drawing Sheets

CAB FOR EARTH-MOVING MACHINES

BACKGROUND OF THE INVENTION

1. Technical Field of the Invention

The present invention relates to a cab for earth-moving machines.

2. Prior Art

Earth-moving machines are composed of a frame mounted on four wheels, of at least an articulated arm fastened to the frame and bearing a work tool (such as a shovel), and a cab for housing an operator, mounted on the frame. Alternatively, the frame can be equipped with tracks instead of wheels.

Such machines further comprise a driving system an a system for actuating the arm, motorized and able to be activated by the operator.

Hereafter, reference shall be made in particular to earth-moving machines of the category known in the art with the name of "skid steer loader", whereto the subject invention is preferably destined. However, the invention is applicable in general to every kind of earth-moving machine.

The cab is composed of a structure having an opening to allow the entry and the exit of an operator into and out of the cab itself.

In the interior compartment of the cab is defined a control station for the operator, generally constituted by a seat in front of which are located the levers for controlling the equipment of the machine.

The machine is activated by the operator by means of two control levers positioned one to his/her right and the other to his/her left, and connected one to the driving system and the other to the system for actuating the articulated arm.

The driving system and the system for actuating the articulated arm are both constituted by a hydraulic servo control system connected between one of the control levers and the related activated organ. The cab is also provided with one or more control panels for controlling the operation of the machine. Such panels are typically fastened to the upper part of the cab frontally relative to the control station.

The cab is further provided with a safety bar which allows the operator to remain secured to the seat during the operation of the machine, and to avoid the risks connected to the use of the machine.

Such machines are often used on rough terrain so that there is always the risk that they may be overturned and that the operator be ejected from the cab.

The bar is pivotally fastened to the cab and can move from a safety position in which, as stated, it secures the operator on the seat, to a non operative position in which the operator is free to sit and get up from the seat.

In the prior art, substantially two types of bars exist.

A first type is represented by bars constituted by a single arm, prevalently "C" shaped. This arm can be fastened to the cab at one or both ends, and can rotate about a longitudinal or a transverse axis, both defined with reference to the direction of advance of the machine. The arm can be fastened to the cab in such a way as to orient, in the safety position, its concave part towards the operator, as taught in U.S. Pat. Nos. 5,050,700 and 5,971,434.

A second known type of safety bar is constituted by two arms, substantially "L" shaped. These arms are pivotally fastened with their shorter portion to the cab, and each can rotate about a longitudinal axis of rotation.

The two arms are mounted symmetrically relative to the seat, so that, when they are brought to the safety position, their free ends mutually engage to form in co-operation the safety bar.

In the non-operative position, the arms are located each in a substantially vertical plane, to the two sides of the seat.

Also widely used are automatic safety devices connected to the safety bars, to stop the engine when the bar is in the non operative position, in order to prevent the machine from operating without an operator sitting at the controls.

The prior art described, however, presents several drawbacks.

In the first place, the location of the control panel is such that the operator, to observe it, must orient his/her gaze upwards. This is very annoying particularly on sunny days, as the operator can be dazzled or at the very least be bothered by the reflection of the sun.

In addition to being an annoyance, this is also a source of risk because, under such circumstances, the operator is induced to be distracted and can lose control of the machine.

Additionally, the operator cannot even move to a shaded area, since this is prevented by the safety bar which blocks his/her movements.

A further drawback is represented by the working position the operator is obliged to assume because of the combined action of seat and bar.

The operator in working position is naturally induced to orient his/her gaze towards the ground in front of him/her, in the working area of the shovel or other tool.

However, when he/she has to check any parameter of the machine on the control panel, he/she has to raise his/her head and look in a direction that is not the optimal one for his/her job, with the consequent risks of losing control of the shovel.

Moreover, the continuous motion of the head to shift attention from the tool to the control panel inevitably brings the operator to an undesired level of tiredness.

The shape and disposition of the internal organs of the cabs currently used are thus lacking from the ergonomic point of view.

SUMMARY OF THE INVENTION

In this situation the technical task serving as the basis for the present invention is to obtain a cab for earth-moving machines which overcomes the aforesaid drawbacks.

Another technical task of the present invention is to obtain a cab for earth-moving machines which is particularly ergonomic.

The specified technical task and the indicated aims are substantially achieved by a cab for earth-moving machines as described in the accompanying drawings.

BRIEF DESCRIPTION OF THE DRAWINGS

Further features and advantages of the invention shall become more readily apparent from the detailed description of a preferred but not exclusive embodiment of a cab for earth-moving machines illustrated in the accompanying drawings, in which.

DESCRIPTION OF THE PREFERRED EMBODIMENTS

Figure 1:
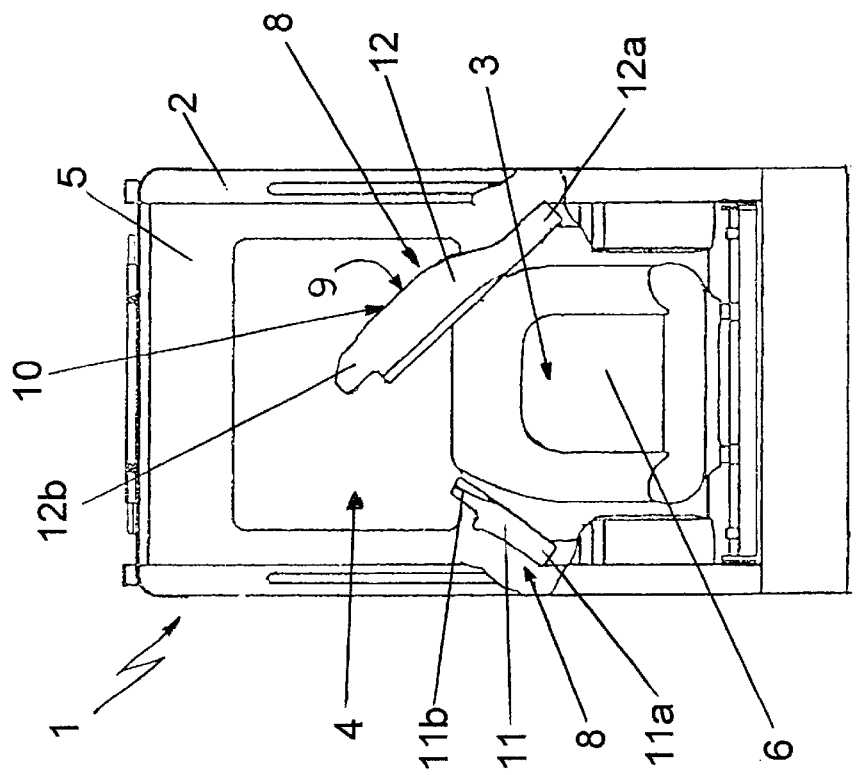
FIG. 1 is a front elevation view of a cab for earth-moving machines in accordance with a first embodiment the present invention, with a safety bar in safety position.

With reference to the aforementioned figures, the number 1 globally indicates a cab for earth-moving machines in accordance with the present invention.

The cab 1 comprises a structure 2 which defines in its interior a control station 3 for an operator from which the operator can control the operation of an earth-moving machine.

An opening 4, which in the illustrated embodiments is obtained in a front portion 5 of the structure 2, allows operator entry and exit.

In the control station 3 is mounted a seat 6.

Anteriorly to the seat 6 are positioned two control levers 7 with which the operator can activate the earth-moving machine.

The cab 1 further comprises a safety bar 8 pivotally fastened inside the structure 2.

The bar 8 is movable from a safety position to a non operative position. In the safety position, the bar 8 is located in front of the control station 3 and the operator is secured in the control station 3.

With the bar 8 in non operative position, the operator is free to move from the control station 3.

The cab 1 further comprises a control panel 9 of the machine, oriented towards the control station 3. The control panel 9 is provided with indicator lights and organs for signaling the functions of the machine.

The control panel 9 is integrally mounted on a portion 10 of the bar 8 oriented towards the control station 3 when the bar 8 is in the safety position.

In a first embodiment (Figures from 1 to 4), the safety bar 8 comprises a first movable arm 11 and a second movable arm 12, each essentially "L" shaped, and mounted on the structure 2 laterally relative to the control station 3.

The first arm 11 presents a first end 11a pivotally connected to the structure 2 and a second end 11b.

The second arm 12 presents a first end 12a pivotally connected to the structure 2 and a second end 12b able to engage the second end 11b of the first arm 11, when the arms 11, 12 are in the safety position, to form in co-operation the safety bar 8.

In the preferred embodiment, each arm 11, 12 rotates about an axis substantially parallel to the direction of advance of the earth-moving machine whereon the cab 1 is to be mounted and passing through the first end 11a, 12a.

Figure 2:
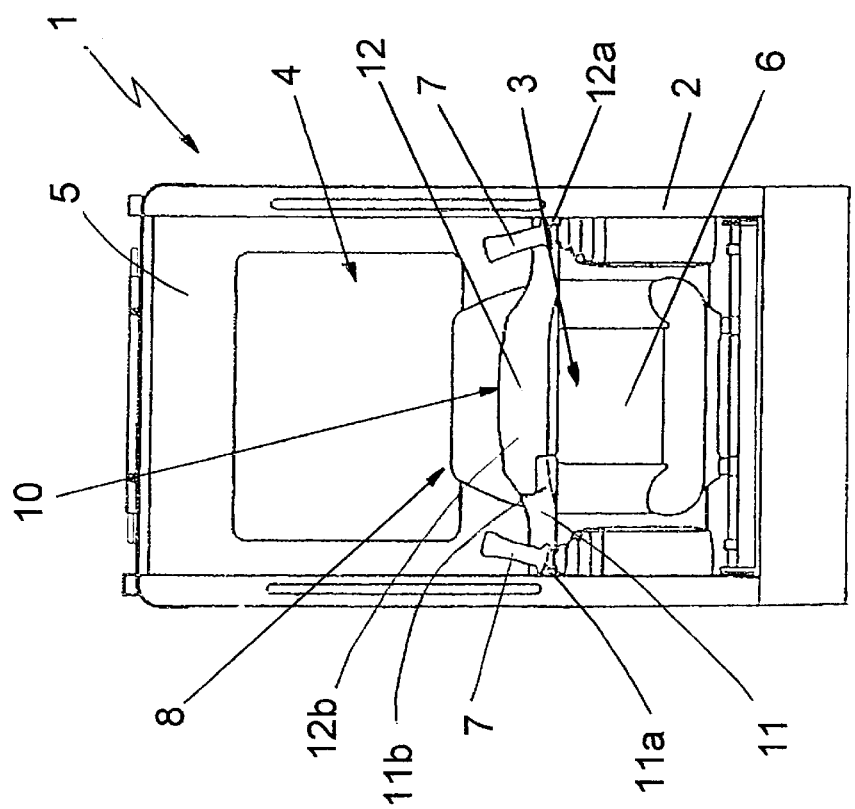
FIG. 2 is a front elevation view, with some parts removed the better to highlight others, of the cab of FIG. 1 with the safety bar in an intermediate position.
Figure 4:
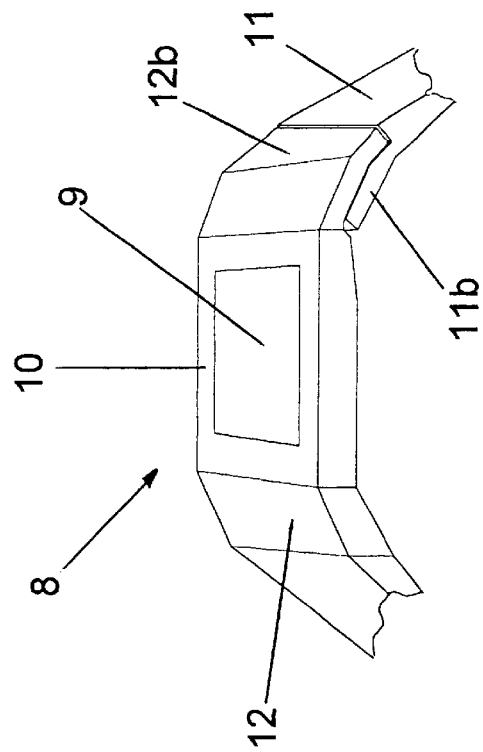
FIG. 4 is a partial schematic perspective view of the bar of FIG. 1.
Figure 3:
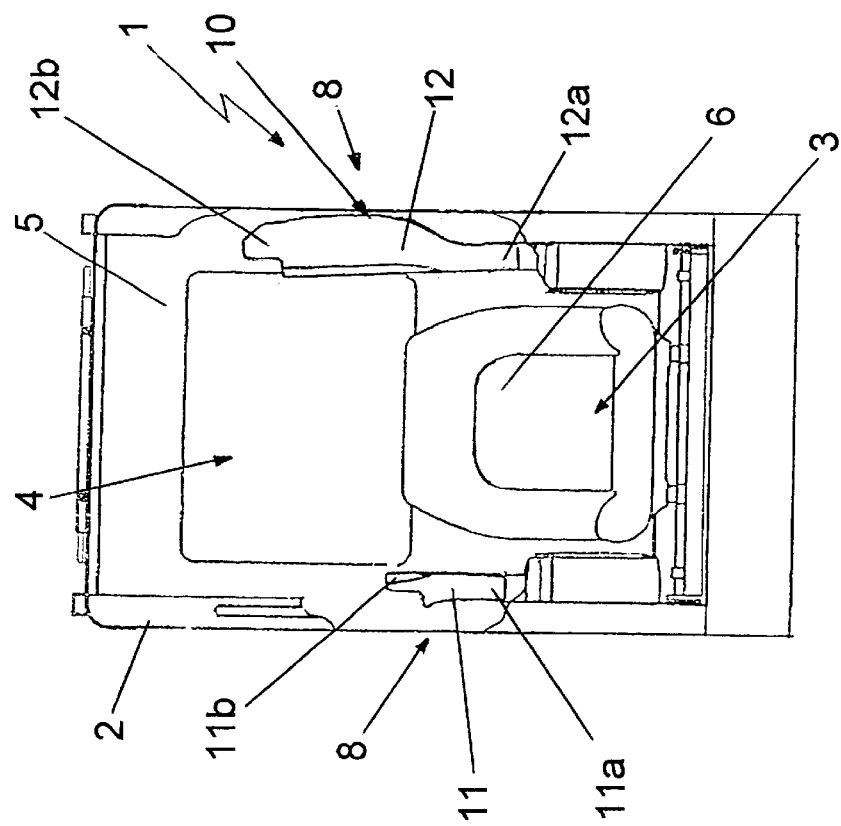
FIG. 3 is a front elevation view, with some parts removed the better to highlight others, of the cab of FIG. 1 with the safety bar in non operative position.
Figure 5:
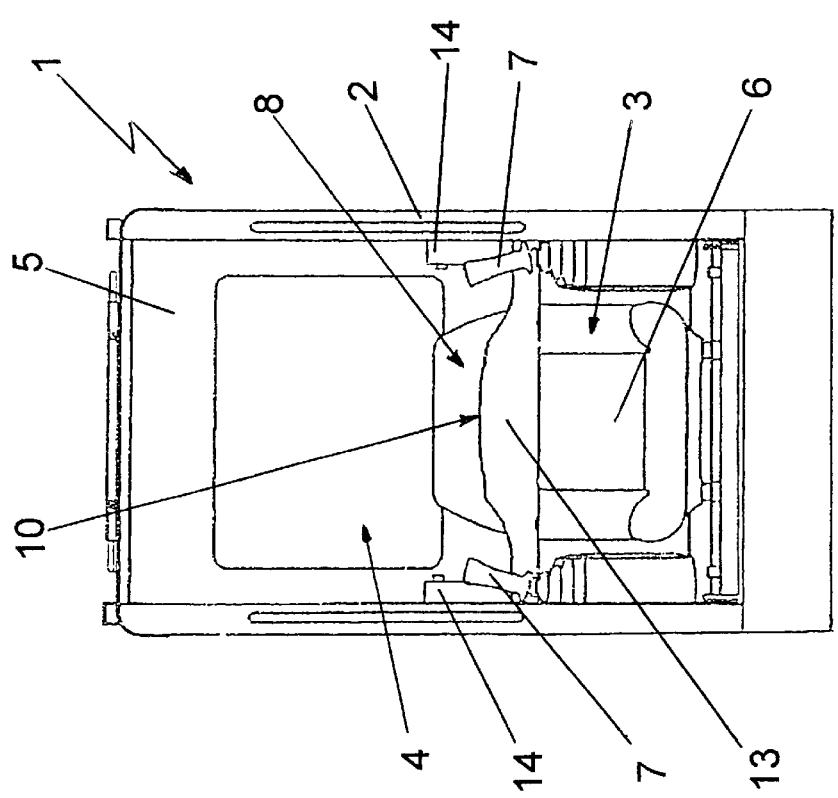
FIG. 5 is a front elevation view of a cab obtained in accordance with a second embodiment of the present invention, with the safety bar in safety position.

FIG. 2 shows the safety bar 8 in an intermediate position between the safety position and the non operative position. In the first embodiment the control panel 9 is integrally mounted on at least one of said arms 11, 12, as FIG. 4 shows. In the second embodiment (FIGS. 5 and 6) the bar 8 comprises an essentially "C" shaped arm 13 having at least an end 14 pivotally connected to the structure 2.

In particular, in the second illustrated embodiment, the bar 8 is pivotally connected to the structure 2 in correspondence with both ends 14 of the bar 8.

Figure 6:
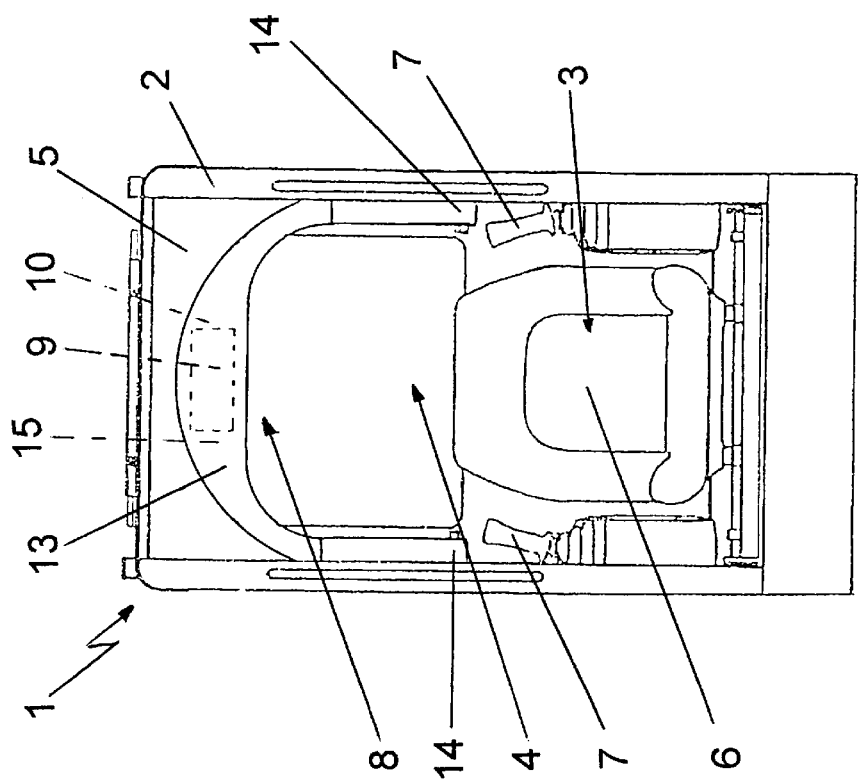
FIG. 6 is a front elevation view of the cab in FIG. 5 with the safety bar in non operative position.

The bar 8 can rotate about a transverse axis relative to the direction of advance of the machine, from the safety position in which it is lowered (FIG. 5) to the non operative position in which it is raised (FIG. 6).

In this second embodiment the control panel 9 is integrally mounted on said arm 13 in correspondence with its central portion 15 (FIG. 6).

Both embodiments can provide for known protective devices connected to the bar 8 to prevent the operation of the earth-moving machine when the bar 8 is not in the safety position.

From the operational point of view, when the safety bar 8 is in the non operative position the operator can access the cab 1, and take his/her place in the control station 3.

Subsequently the operator moves the bar 8 to the safety position and proceeds to operate the machine.

During the maneuvers of the machine the operator can check data on the control panel 9 simply by slightly lowering his/her gaze.

The present invention achieves important advantages.

In the first place, the control panel is located in such a way as to be easily observed by the operator without running the risk of being distracted from maneuvering the machine.

In the second place the shape of the cab according to the present invention is ergonomic, since the control panel is in the optimal position in relation to the position the operator assumes while maneuvering the machine.

While driving, the operator sits on the seat and grips the control levers with his/her arms set down on the bar.

In this situation the operator's gaze can naturally be oriented towards the terrain in front of the machine or towards the control panel through a simple motion of the eyes.

It should also be noted that the present invention is relatively easy to construct and its costs are low.

The invention thus conceived can be subject to numerous modifications and variations, without thereby departing from the scope of the inventive concept characterizing it.

All components can be replaced by technically equivalent elements and in practice, all materials employed, as well as the dimensions, can be any depending on needs.

What is claimed is:

1. A cab for earth-moving machines, of the type comprising:
    a structure having at least an opening for the entry and exit of an operator,
    a control station for the operator defined inside the structure, from which the operator can control the operation of an earth-moving machine,
    at least a control panel of the machine, mounted in said structure and oriented towards the control station, and
    a safety bar pivotally fastened internally to said structure and movable from a safety position in which said bar is positioned in front of the control station and in which the operator is secured in the control station, and a non operative position, distanced from the safety position, in which the operator is free to move from the control station, wherein said control panel is integrally mounted on a central portion of said bar along the longitudinal axis of the cab and inclined towards the control station when said bar is in said safety position.

2. A cab as claimed in claim 1, wherein said bar comprises a substantially "C" shaped arm having at least an end pivotally connected to the structure, said control panel being integrally mounted on said arm.

3. A cab as claimed in claim 1, wherein said bar comprises a first movable arm, substantially "L" shaped, which is mounted on said structure laterally relative to the control station, and presents a first end pivotally connected to the structure and a second end; and a second movable arm, essentially "L" shaped, which is mounted on said structure laterally relative to the control station, and presents a first end pivotally connected to the structure and a second end able to engage the second end of the first arm, when said arms, are in said safety position, said control panel being integrally mounted on at least one of said arms.

* * * * *